US012784649B2

(12) United States Patent
Schultz

(10) Patent No.: US 12,784,649 B2
(45) Date of Patent: Nov. 3, 2026

(54) SMART GLASSES WITH LED PROJECTOR ARRAYS

(71) Applicant: Vuzix Corporation, West Henrietta, NY (US)

(72) Inventor: Robert J. Schultz, Victor, NY (US)

(73) Assignee: Vuzix Corporation, West Henrietta, NY (US)

( * ) Notice: Subject to any disclaimer, the term of this patent is extended or adjusted under 35 U.S.C. 154(b) by 637 days.

(21) Appl. No.: 18/024,050

(22) PCT Filed: Sep. 1, 2021

(86) PCT No.: PCT/US2021/048728
§ 371 (c)(1),
(2) Date: Feb. 28, 2023

(87) PCT Pub. No.: WO2022/051407
PCT Pub. Date: Mar. 10, 2022

(65) Prior Publication Data

US 2023/0273435 A1 Aug. 31, 2023

Related U.S. Application Data

(60) Provisional application No. 63/073,358, filed on Sep. 1, 2020.

(51) Int. Cl.
*G09G 5/10* (2006.01)
*F21V 8/00* (2006.01)
(Continued)

(52) U.S. Cl.
CPC ............... *G09G 3/32* (2013.01); *G02B 3/005* (2013.01); *G02B 6/0073* (2013.01); (Continued)

(58) Field of Classification Search
CPC ......... G09G 3/32; G02B 3/005; G02B 6/0073
(Continued)

(56) References Cited

U.S. PATENT DOCUMENTS 5,048,077 A 9/1991 Wells et al.
10,331,207 B1 6/2019 Simmons
(Continued)

FOREIGN PATENT DOCUMENTS

CN 102707552 A 10/2012
CN 103348278 A 10/2013
(Continued)

OTHER PUBLICATIONS

United States Patent & Trademark Office (ISA/US), International Search Report and Written Opinion in PCT/US2021/048728, dated Dec. 2, 2021, 13 pages.
(Continued)

*Primary Examiner* — Jonathan M Blancha
(74) *Attorney, Agent, or Firm* — Harter Secrest & Emery LLP; Jacob D. Merrill, Esq.

(57) ABSTRACT

An image source including a first light emitting diode array and a second light emitting diode array coupled with a fixed panel. The image source further including a first lens system located at an effective focal length from the first light emitting diode array and a second lens system located at an effective focal length from the second light emitting diode array. Light from corresponding light emitting diodes in the first and second light emitting diode arrays aligned to form a single pixel in an image.

13 Claims, 14 Drawing Sheets

(51) Int. Cl.

| | |
|---|---|
| ***G02B 3/00*** | (2006.01) |
| ***G02B 27/01*** | (2006.01) |
| ***G09G 3/00*** | (2006.01) |
| ***G09G 3/293*** | (2013.01) |
| ***G09G 3/32*** | (2016.01) |
| ***G09G 3/34*** | (2006.01) |

(52) U.S. Cl.
CPC ......... *G02B 27/0172* (2013.01); *G09G 3/007* (2013.01); *G09G 3/293* (2013.01); *G09G 3/3473* (2013.01); *G02B 2207/101* (2013.01)

(58) Field of Classification Search
USPC .......................................................... 345/690
See application file for complete search history.

(56) References Cited

U.S. PATENT DOCUMENTS

| | | | | |
|---|---|---|---|---|
| 10,757,398 | B1 | 8/2020 | Magoz et al. | |
| 2010/0149073 | A1 | 6/2010 | Chaum et al. | |
| 2012/0154920 | A1 | 6/2012 | Harrison et al. | |
| 2013/0286053 | A1 | 10/2013 | Fleck et al. | |
| 2016/0282625 | A1 | 9/2016 | Fleck et al. | |
| 2017/0293140 | A1 | 10/2017 | Cai et al. | |
| 2019/0064526 | A1 | 2/2019 | Connor | |
| 2020/0026081 | A1 | 1/2020 | Jarvenpaa | |
| 2020/0132990 | A1 | 4/2020 | Milford | |
| 2020/0251049 | A1* | 8/2020 | Morris | H10D 86/60 |
| 2021/0159373 | A1* | 5/2021 | Grundmann | H01L 24/80 |
| 2021/0191127 | A1* | 6/2021 | Haddick | G06F 1/163 |
| 2022/0050298 | A1* | 2/2022 | Klug | G02B 27/62 |

FOREIGN PATENT DOCUMENTS

| | | | |
|---|---|---|---|
| CN | 104246578 | A | 12/2014 |
| CN | 107111142 | A | 8/2017 |
| CN | 109983392 | A | 7/2019 |
| CN | 111352241 | A | 6/2020 |
| JP | 2014126644 | A | 7/2014 |
| JP | 2017134226 | A | 8/2017 |
| WO | 2012083042 | A1 | 6/2012 |
| WO | 2013162977 | A1 | 10/2013 |
| WO | 2016112128 | A1 | 7/2016 |
| WO | 2017180408 | A1 | 10/2017 |
| WO | 2018107150 | A1 | 6/2018 |

OTHER PUBLICATIONS

Feng et al. (2016) “Design of double freeform surface lens based on LED radiation characteristics,” Optics and Precision Engineering 24(8): 1884-1893.

Yang et al. (2018) “Design of digital image source backlight assembly for airborne head-up display,” Optical Technique 44(6): 727-732.

* cited by examiner

SMART GLASSES WITH LED PROJECTOR ARRAYS

This patent application is a national phase application under 35 U.S.C. § 371 of International Patent Application No. PCT/US2021/048728, filed Sep. 1, 2021, entitled "SMART GLASSES WITH LED PROJECTOR ARRAYS", which claims the priority benefit of U.S. Provisional Patent Application No. 63/073,358, filed Sep. 1, 2020, entitled "SMART GLASSES WITH LED PROJECTOR ARRAYS", each of which is incorporated herein by reference in its entirety for all purposes.

TECHNICAL FIELD

The present disclosure relates generally to electronic displays, and more specifically to a smart glasses device having microLED projector arrays.

BACKGROUND

Head-Mounted Displays (HMD's) and virtual image near-eye displays are being developed for a range of diverse uses, including military, commercial, industrial, fire-fighting, and entertainment applications. For many of these applications, there is value in forming a virtual image that can be visually superimposed over the real-world image that lies in the field of view of the HMD user. An optical image light guide may convey image-bearing light to a viewer in a narrow space for directing the virtual image to the viewer's pupil and enabling this superposition function.

With rapid advances in technology, manufacturers of mobile devices (e.g., head mounted displays, smart glasses, etc.) are continually challenged to add greater functional capability in smaller form to achieve convenience of mobility. Although conventional image light guide arrangements have provided significant reduction in bulk, weight, and overall cost of near-eye display optics, further improvements are needed. In some instances, the size and brightness of the image source (e.g., projector) constrains the size and placement of other components, forcing HMD designs to limit tolerances for movement and device placement. Thus, there is particular value in an image source having reduced size, yet having the capability to produce the desired virtual image brightness.

SUMMARY

The present disclosure provides for a monolithic multi-array LED projector.

In a first exemplary embodiment, the present disclosure provides for an image source including a first light emitting diode array and a second light emitting diode array coupled with a fixed panel. The image source further including a first lens system located at an effective focal length from the first light emitting diode array and a second lens system located at an effective focal length from the second light emitting diode array. Light from corresponding light emitting diodes in the first and second light emitting diode arrays aligned to form a single pixel in an image.

In an embodiment, the image source may further enable digitally aligning pixels generated by said first and second light emitting diode arrays via changing an ON/OFF state of one or more light emitting diodes of one or more of said first and second light emitting diode arrays until said pixels align.

In an embodiment, the image source may further enable aligning pixels generated by said first and second light emitting diode arrays via independently adjusting one or more lenses of the first and second lens systems to align light from the corresponding individual light emitting diodes to form a single pixel in a virtual image.

In an embodiment, the image source may further enable aligning pixels generated by said first and second light emitting diode arrays via independently adjusting one or more of the first and second light emitting diode arrays to align light from the corresponding individual light emitting diodes to form a single pixel in a virtual image.

In a second exemplary embodiment, the present disclosure provides for an image light guide for conveying a virtual image including an image source having a first addressable light emitting diode array operable to emit a first image-bearing light beam in a first direction, a second addressable light emitting diode array configured to emit a second image-bearing light beam in a second direction perpendicular to the first direction, and a third addressable light emitting diode array. The image source further including a beam combiner located in an optical path of the first and second light emitting diode arrays, a first lens system located at an effective focal length from the first light emitting diode array and the second light emitting diode array, wherein image-bearing light from the beam combiner is incident on the first lens system. The image source also including a second lens system located at an effective focal length from the third light emitting diode array. The image light guide including a planar waveguide operable to propagate image-bearing light beams, a first in-coupling diffractive optic formed along the waveguide, wherein the first in-coupling diffractive optic is operable to diffract at least a portion of the image-bearing light beams from the first and second light emitting diode arrays into the waveguide in an angularly encoded form, a second in-coupling diffractive optic formed along the waveguide, wherein the second in-coupling diffractive optic is operable to diffract at least a portion of the image-bearing light beams from the third light emitting diode array into the waveguide in an angularly encoded form, and an out-coupling diffractive optic formed along the waveguide, wherein the out-coupling diffractive optic is operable to expand the image-bearing light beams and direct the expanded image-bearing light beams from the waveguide in an angularly decoded form toward an eyebox. Wherein image-bearing light from corresponding individual light emitting diodes in the first, second, and third light emitting diode arrays are aligned to form a single pixel in a virtual image as viewed in the eyebox.

In a third exemplary embodiment, the present disclosure provides for a method of aligning pixels of different wavelength ranges including providing a fixed panel; providing a first light emitting diode array coupled with the fixed panel; providing a second light emitting diode array coupled with the fixed panel; providing a first lens system located at an effective focal length from the first light emitting diode array; providing a second lens system located at an effective focal length from the second light emitting diode array; providing an alignment lens adjacent to the first and second lens systems, wherein light transmitted through the first and second lens systems is incident upon the alignment lens; providing a display surface at an effective focal length distance from the alignment lens opposite the first and second lens systems; generating a first light beam forming a first pixel with the first light emitting diode array; generating a second light beam forming a second pixel with the second light emitting diode array; and aligning the first and second pixels on the display surface.

BRIEF DESCRIPTION OF THE DRAWINGS

The accompanying drawings are incorporated herein as part of the specification. The drawings described herein illustrate embodiments of the presently disclosed subject matter and are illustrative of selected principles and teachings of the present disclosure. However, the drawings do not illustrate all possible implementations of the presently disclosed subject matter and are not intended to limit the scope of the present disclosure in any way.

DETAILED DESCRIPTION

Figure 1:
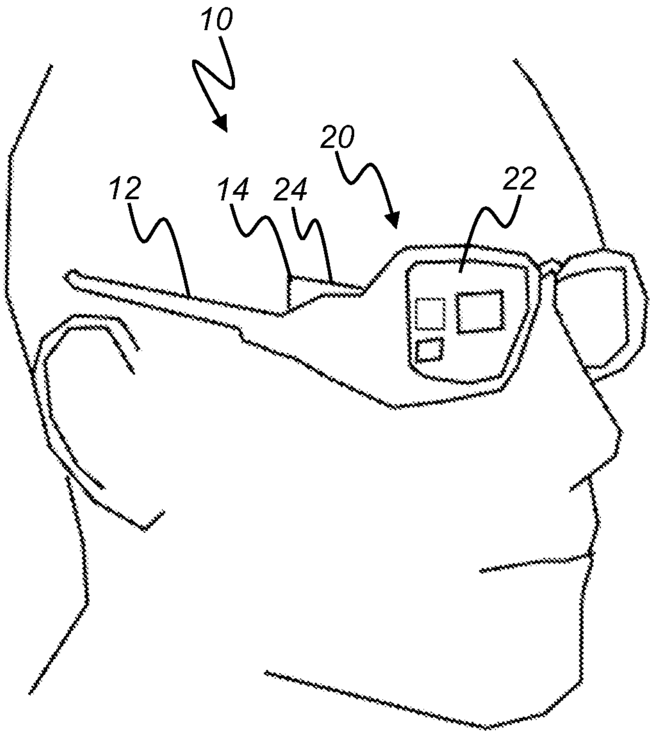
FIG. 1 shows a perspective view of a schematic of a smart glasses device according to an embodiment of the present disclosure.
Figure 2A:
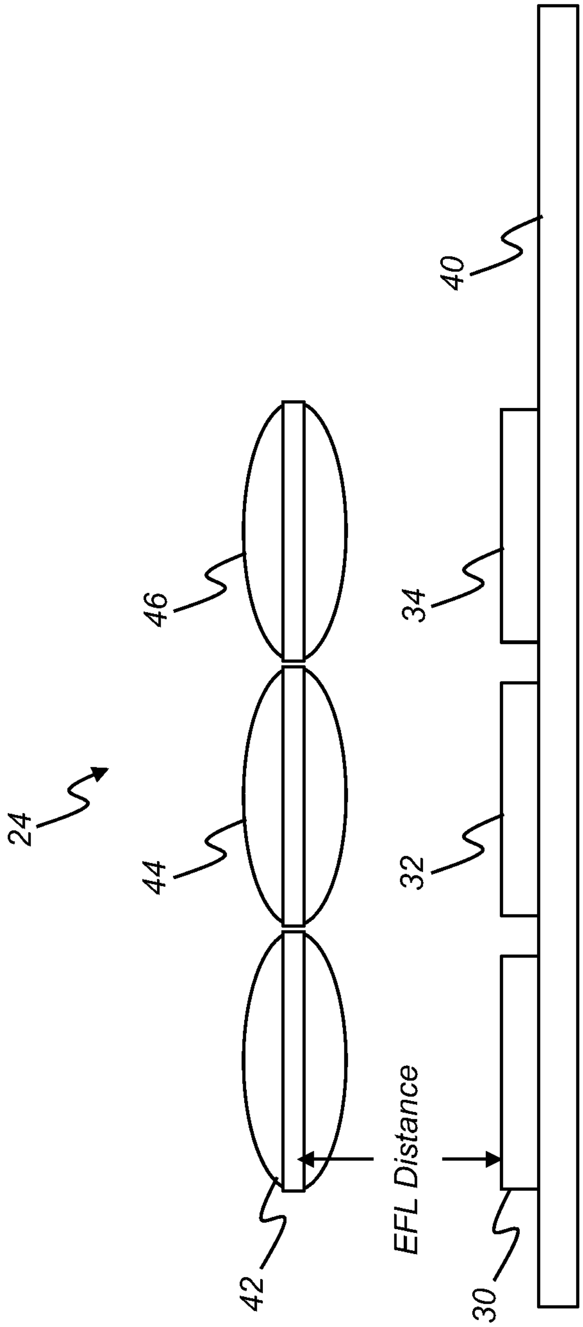
FIG. 2A shows a side view of a schematic of a portion of an image source according to an embodiment of the present disclosure.
Figure 2B:
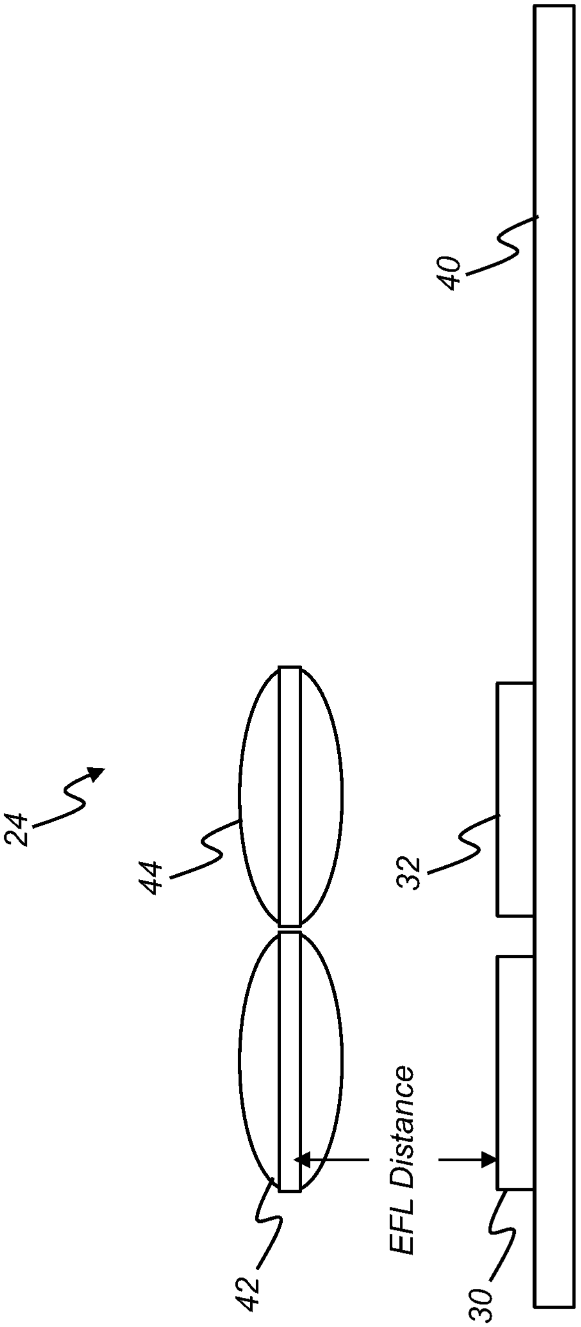
FIG. 2B shows a side view of a schematic of a portion of an image source according to an embodiment of the present disclosure.

It is to be understood that the invention may assume various alternative orientations and step sequences, except where expressly specified to the contrary. It is also to be understood that the specific assemblies and systems illustrated in the attached drawings and described in the following specification are simply exemplary embodiments of the inventive concepts defined herein. Hence, specific dimensions, directions, or other physical characteristics relating to the embodiments disclosed are not to be considered as limiting, unless expressly stated otherwise. Also, although they may not be, like elements in various embodiments described herein may be commonly referred to with like reference numerals within this section of the application.

Where they are used herein, the terms “first”, “second”, and so on, do not necessarily denote any ordinal, sequential, or priority relation, but are simply used to more clearly distinguish one element or set of elements from another, unless specified otherwise.

Where they are used herein, the terms “viewer”, “operator”, “observer”, and “user” are considered to be equivalent and refer to the person or machine wearing and/or viewing images using an electronic device.

Where used herein, the term “set” refers to a non-empty set, as the concept of a collection of elements or members of a set is widely understood in elementary mathematics. The term “subset”, unless otherwise explicitly stated, is used herein to refer to a non-empty proper subset, that is, to a subset of the larger set, having one or more members. For a set S, a subset may comprise the complete set S. A “proper subset” of set S, however, is strictly contained in set S and excludes at least one member of set S.

Where used herein, the terms “beam expansion,” “expansion of an image-bearing beam,” and “expanded image-bearing light” are intended to mean replication of a beam via multiple encounters with an optical element to provide exit pupil expansion in one or more directions. Similarly, as used herein, to “expand” a beam, or a portion of a beam, is intended to mean replication of a beam via multiple encounters with an optical element to provide exit pupil expansion in one or more directions.

Head-Mounted Displays (HMDs) are developed for a range of diverse uses, including military, commercial, industrial, fire-fighting, and entertainment applications. An HMD is operable to form a virtual color image that can be visually superimposed over the real-world image that lies in the field of view of the HMD user. Optically transparent flat parallel plate waveguides, also called planar waveguides, convey image-bearing light generated by a polychromatic, or monochromatic, projector system to the HMD user. The planar waveguides convey the image-bearing light in a narrow space to direct the image to the HMD user’s pupil and enable the superposition of the virtual image over the real-world image that lies in the field of view of the HMD user.

In imaging light guides, collimated, relatively angularly encoded light beams from a color image projector source are coupled into an optically transparent planar waveguide assembly by an input coupling optic, such as an in-coupling diffractive optic, which can be mounted or formed on a surface of the parallel plate planar waveguide or disposed within the waveguide. Such diffractive optics can be formed as, but are not limited to, diffraction gratings or holographic optical elements. For example, the diffraction grating can be formed as a surface relief grating. After propagating along the planar waveguide, the diffracted color image-bearing light can be directed back out of the planar waveguide by a similar output grating, which may be arranged to provide pupil expansion along one or more dimensions of the virtual image. In addition, one or more diffractive turning gratings may be positioned along the waveguide optically between the input and output gratings to provide pupil expansion in one or more dimensions of the virtual image. The image-bearing light output from the parallel plate planar waveguide provides an expanded eyebox for the viewer. Multiple encounters of the image-bearing light along the length of the out-coupling diffractive optic in the direction of propagation have the effect of expanding one direction of the eyebox within which the beams overlap. The expanded eyebox decreases sensitivity to the position of a viewer's eye for viewing the virtual image.

An optical system, such as a HMD, can produce a virtual image. In contrast to methods for forming a real image, a virtual image is not formed on a display surface. That is, if a display surface were positioned at the perceived location of a virtual image, no image would be formed on that surface. Virtual images have a number of inherent advantages for augmented reality presentation. For example, the apparent size of a virtual image is not limited by the size or location of a display surface. Additionally, the source object for a virtual image may be small; for example, a magnifying glass provides a virtual image of an object. In comparison with systems that project a real image, a more realistic viewing experience can be provided by forming a virtual image that appears to be some distance away. Providing a virtual image also obviates the need to compensate for screen artifacts, as may be necessary when projecting a real image.

To couple image content into waveguides, injection optics often use spatial light modulator microdisplays that modulate light incident of each display pixel along with projection optics to create virtual images. However, transmissive spatial light modulators used in this manner can be optically inefficient thereby increasing power requirements of the light source. Consequently, illumination sources such as light emitting diodes (LEDs) must be driven with higher currents, increasing power consumption and heating. Reflective spatial light modulators such as liquid crystal on silicon (LCoS) or DLP (Digital Light Processing) can be optically more efficient and are used in a number of applications such as digital projectors. However, because transmissive or reflective systems modulate incident light rather than emit light, they require additional optics that project, condense, and split output beams from the LED sources. Although much effort in the industry has been devoted to miniaturizing "engines" that integrate displays, sources, projection optics, beam splitters, polarizers, heat sinks, etc., state-of-the-art dimensions are still undesirably large for HMDs. Additional drawbacks associated with current engine technology negatively affect cost, size, weight, and power. Because these displays only modulate incident light, the light source must remain turned on regardless of image content. For example, a bright full-screen virtual image and a simple arrow that takes up only 5% of the display pixels will consume approximately the same power.

Self-emitting displays can circumvent many of the aforementioned problems. Inorganic and organic LED arrays (OLED) produce light on a pixel-by-pixel basis to produce the desired image. Self-emitting pixel-addressable displays such as OLEDs consume power depending on how many pixels are addressed and the specific brightness of each pixel addressed. This pixel-power addressable approach can substantially decrease power consumption. A significant advantage of self-emitting pixel-addressable displays is that such displays do not require projection optics to illuminate the spatial light modulator display. Therefore, no micromirror arrays are required.

As illustrated in FIG. 1, in an embodiment, a display system operable for augmented reality viewing comprises smart glasses 10. The smart glasses 10 include at least a right temple arm 12 and a processing unit 14 having memory operable to store data and computer programs. The processing unit 14 is also operable to execute the computer programs. The smart glasses 10 may include a right eye optical system 20 having an image light guide 22. The smart glasses 10 include an image source 24 energizable to generate an image. The virtual image that is formed by the smart glasses 10 can appear to be superimposed or overlaid onto the real-world scene content as seen by the viewer through the image light guide 22. Additional components familiar to those skilled in the augmented reality visualization arts, such as one or more cameras mounted on the frame of the HMD for viewing scene content and/or viewer gaze tracking, can also be provided.

As illustrated in FIGS. 2A-4C, in an embodiment, the image source 24 includes multiple LED arrays 30, 32, 34. In an embodiment, the first LED array 30 is formed of a plurality of individually addressable LEDs operable to emit light in the green wavelength range, the second LED array 32 is formed of a plurality of individually addressable LEDs operable to emit light in the red wavelength range, and the third LED array 34 is formed of a plurality of individually addressable LEDs operable to emit light in the blue wavelength range. In an embodiment, each LED in the LED arrays 30, 32, 34 is generally one micron in width. In an embodiment, the LED arrays 30, 32, 34 have an aspect ratio of 16:9. However, other aspect ratios, such as, but not limited to, 3:4 and 21:9 are also contemplated by the present disclosure. The first, second, and third LED arrays 30, 32, 34 are coupled with a fixed panel 40. A first multi-lens system 42 is located adjacent to the first LED array 30, a second multi-lens system 44 is located adjacent to the second LED array 32, and a third multi-lens system 46 is located adjacent to the third LED array 34. Each multi-lens system 42, 44, 46 is located at an effective focal length ("EFL") distance from each LED array 30, 32, 34, respectively. In an embodiment, the multi-lens systems 42, 44, 46 are each a lens system of one or more elements having an EFL of some fixed distance.

Figure 3A:
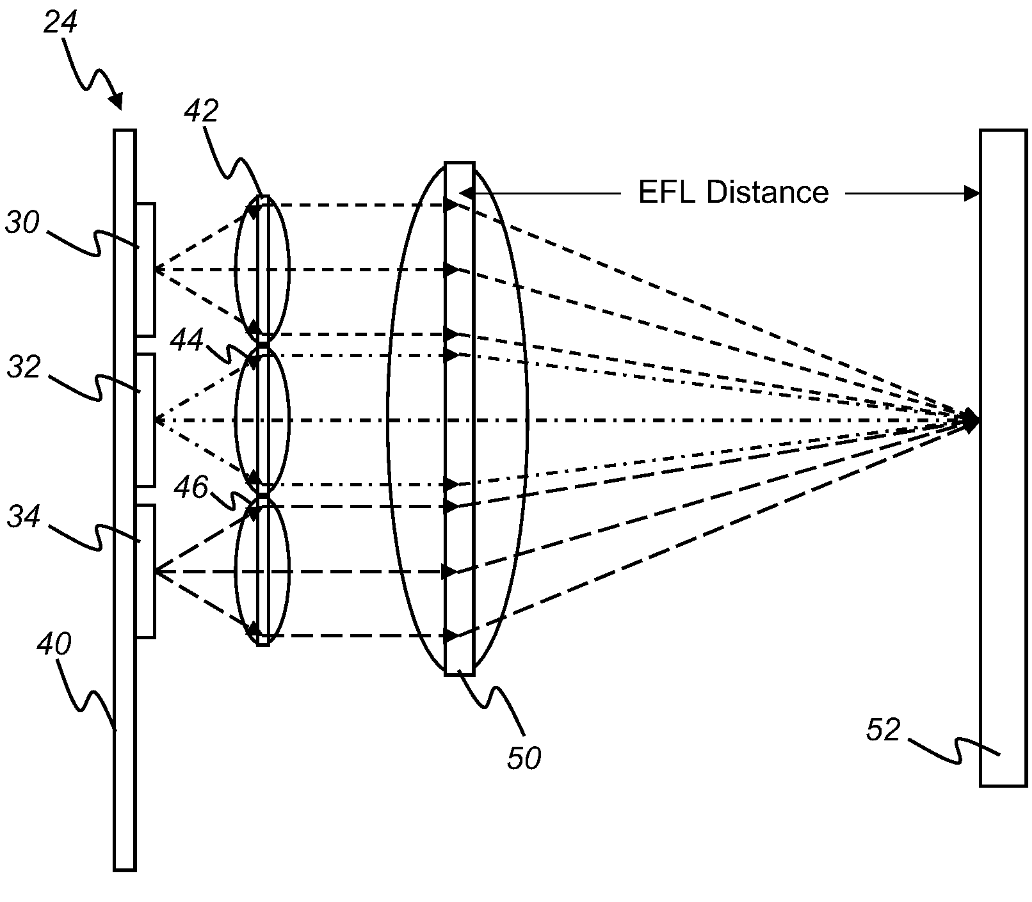
FIG. 3A shows a side view of a schematic of a portion of the image source according to FIG. 2A aligning multiple LED arrays.
Figure 3B:
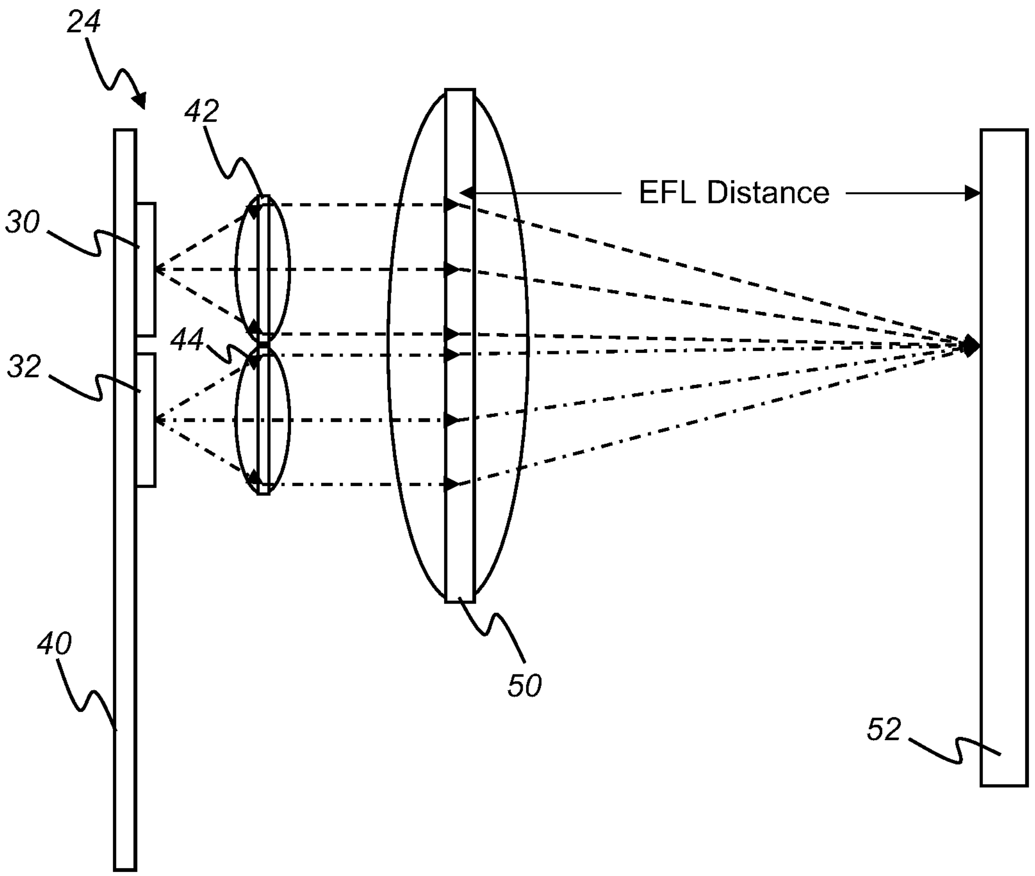
FIG. 3B shows a side view of a schematic of a portion of the image source according to FIG. 2B aligning multiple LED arrays.
Figure 3C:
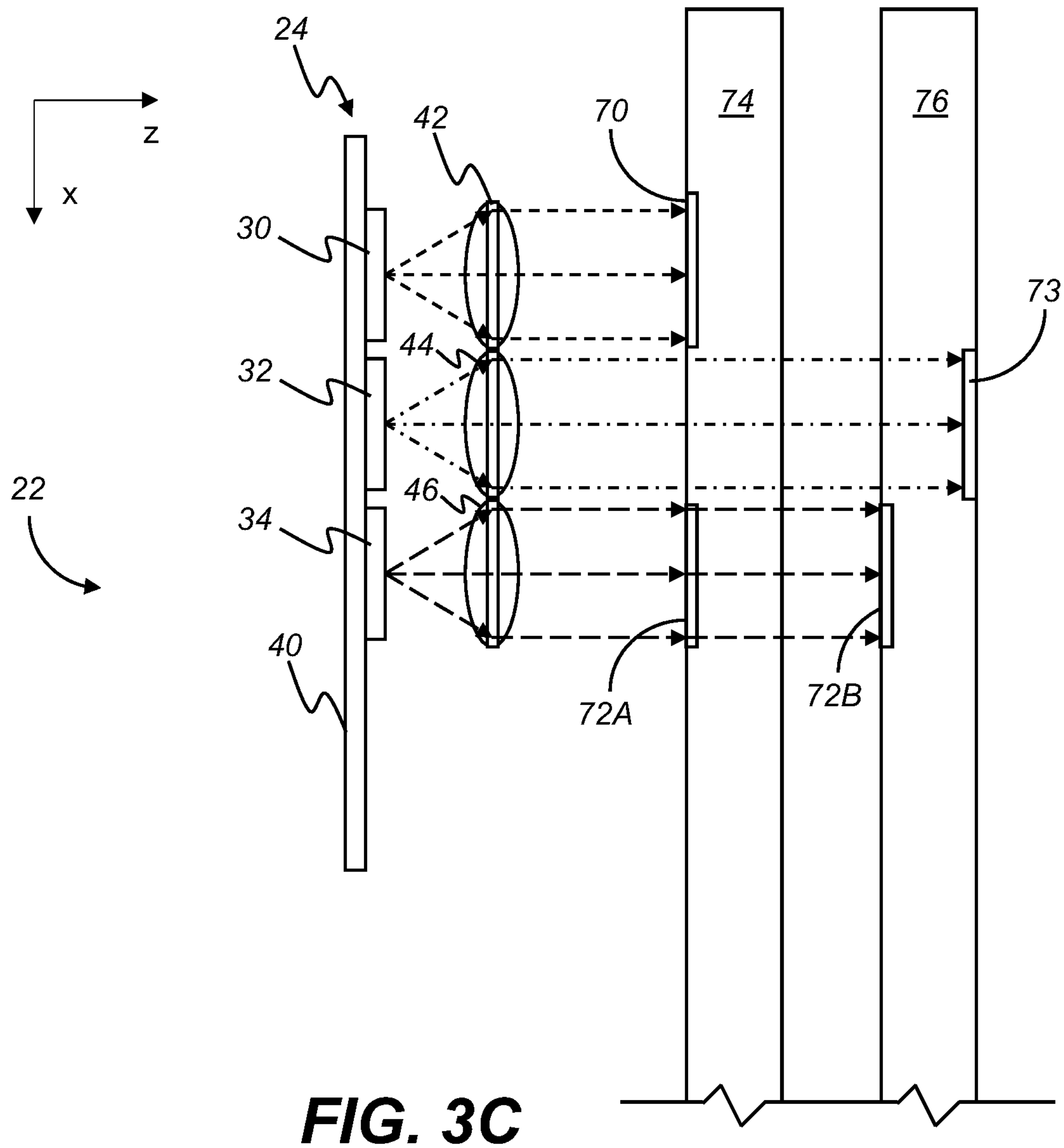
FIG. 3C shows a side view of a schematic of a portion of an image light guide including the image source according to FIG. 2A.

In an embodiment, the backplanes of the LED arrays 30, 32, 34 are actively aligned utilizing images during manufacturing and assembly. The first LED array 30 includes a first backplane, the second LED array 32 includes a second backplane, and the third LED array 34 includes a third backplane. At least during manufacturing and assembly, the first, second, and third LED arrays 30, 32, 34 may be at least partially aligned by shifting and/or rotating the position of the LED backplanes. The LED arrays 30, 32, 34 are aligned such that corresponding pixels from the first, second and third LED arrays 30, 32, 34 are located at the same pixel in the produced image. In an embodiment, as illustrated in FIG. 3A, a lens 50 (e.g., a doublet lens) is located adjacent to the first, second, and third multi-lens systems 42, 44, 46 at an EFL distance from a screen 52 (e.g., a generally flat panel). The position of the first, second, and third LED arrays 30, 32, 34 on the fixed panel 40 is adjusted relative to each other LED array 30, 32, 34 until corresponding pixels from the first, second and third LED arrays 30, 32, 34 are coaxially located at the same pixel on the screen 52. As a result of this alignment, corresponding pixels from the first, second and third LED arrays 30, 32, 34 are coaxially located at the same pixel when viewed through the optical system 20 having the image light guide 22. As illustrated in FIG. 3B, in an embodiment, the image source 24 may only include the first and second LED arrays 30, 32 and the first and second multi-lens systems 42, 44. Referring now to FIG. 3C, the multi-lens systems 42, 44, 46 are operable to align the central rays of the image-bearing light beams emitted from corresponding individual LEDs of each of the arrays 30, 32, 34 such that the image-bearing light beams incident upon the in-coupling optics 70, 72A, 72B, 73 of the waveguides 74, 76 are generally parallel.

In an embodiment, pixel alignment of the LED arrays 30, 32, 34 is adjusted digitally. Alignment calibration software installed on the processor 14 is operable to control the addressable LEDs of the LED arrays 30, 32, 34 to perform digital pixel alignment. Digital pixel alignment may be utilized instead of alignment with the multi-lens systems 42, 44, 46, or in conjunction with alignment with multi-lens systems 42, 44, 46, and/or in conjunction with alignment of the LED array backplanes. In an embodiment, the LED arrays 30, 32, 34 include a plurality of LED's which do not form part of the virtual display. In other words, the LED arrays 30, 32, 34 include excess LEDs on the margins thereof. In an embodiment, digital pixel alignment utilizes the marginal LEDs to change the ON/OFF pixels to align the green, red, and blue pixels in a generated image.

In an embodiment, the first, second, and third multi-lens systems 42, 44, 46 are actively aligned utilizing images during manufacturing and assembly. Each lens of the multi-lens systems 42, 44, 46 are independently adjustable to align pixels from the first, second and third LED arrays 30, 32, 34. For example, the position of one or more lenses of the multi-lens systems 42, 44, 46 may be adjusted until one or more pixels from the first, second and third LED arrays 30, 32, 34 are coaxially located at the same corresponding pixel on the screen 52. Changing the position of one or more lenses of the first, second, and third multi-lens systems 42, 44, 46 changes the angle of the light emitted for each pixel. In an embodiment, the angle of the light emitted from corresponding individual LEDs of each of the arrays 30, 32, 34 is aligned to be parallel as transmitted through the multi-lens systems 42, 44, 46.

In another embodiment, the LED arrays 30, 32, 34 are aligned utilizing a combination of backplane alignment, alignment of one or more lenses of the first, second, and third multi-lens systems 42, 44, 46, and digital pixel alignment. For example, the LED arrays 30, 32, 34 may be at least partially aligned utilizing backplane alignment, at least partially aligned utilizing adjustment one or more lenses of the first, second, and third multi-lens systems 42, 44, 46, and further aligned utilizing digital pixel alignment.

In one or more embodiments, the shape and orientation of the fixed panel need not be generally rectangular. As illustrated in FIG. 4B, in an embodiment, the fixed panel 40 may have a generally "L"-shaped geometry. The first, second and third LED arrays 30, 32, 34 may be located in a generally "L"-shape as well. For example, the first and second LED arrays 30, 32 may be generally aligned along a horizontal axis, and the first and third LED arrays, 30, 34 may be generally aligned along a vertical axis.

Figure 4A:
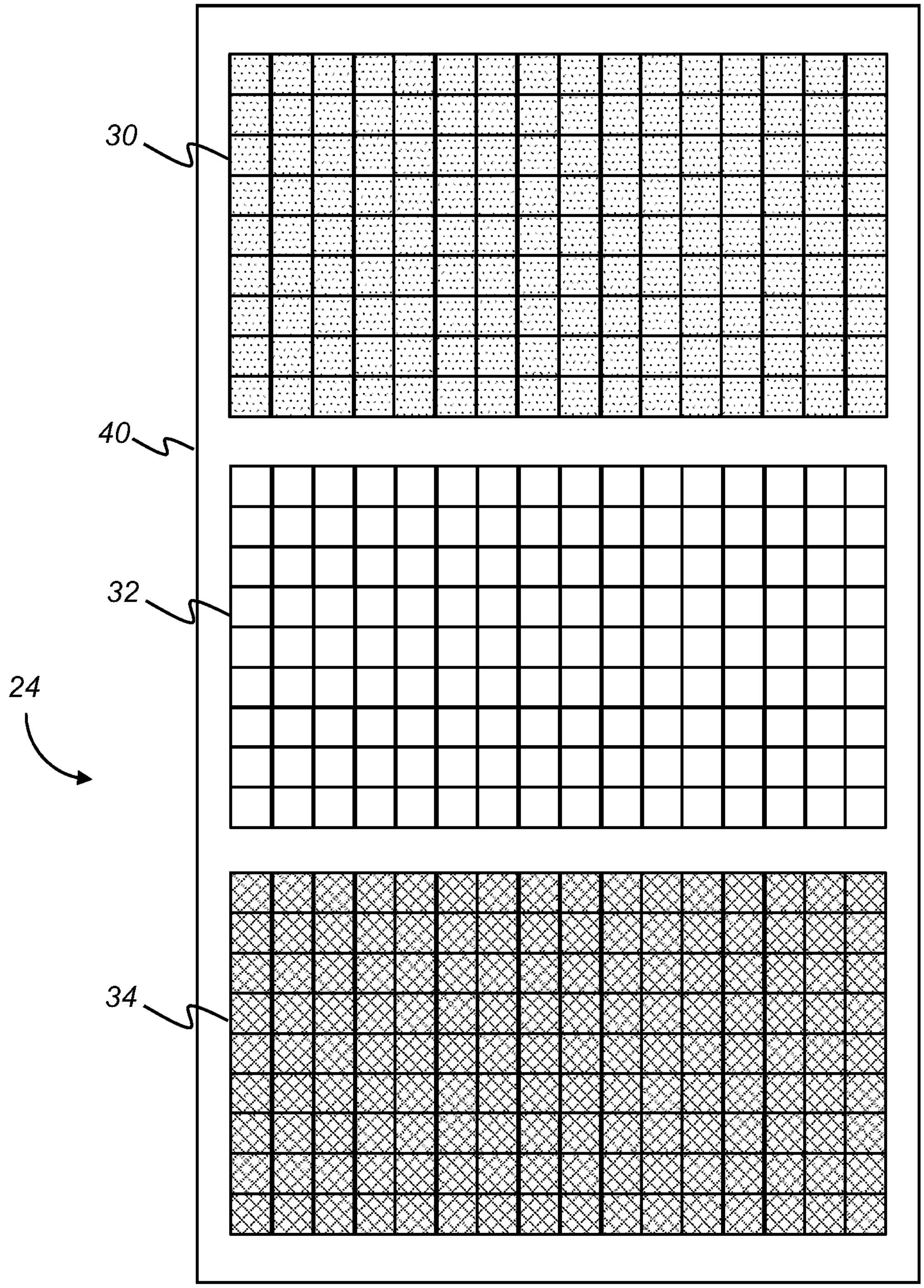
FIG. 4A shows a front view of a schematic of a portion of the image source according to FIG. 2A.
Figure 4C:
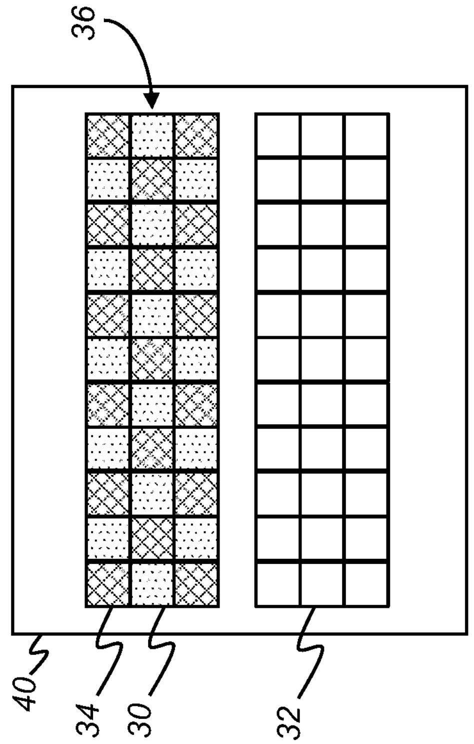
FIG. 4C a front view of a schematic of a portion of an image source according to another embodiment of the present disclosure.
Figure 4B:
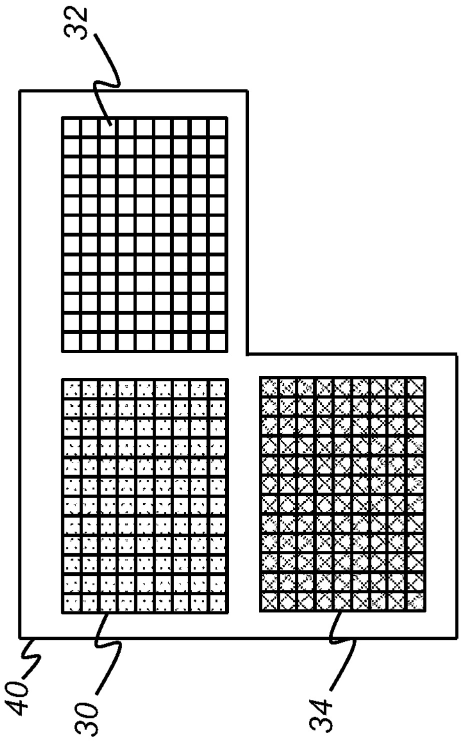
FIG. 4B shows a front view of a schematic of a portion of an image source according to an embodiment of the present disclosure.

As illustrated in FIG. 4C, in an embodiment, the image source 24 includes a combined LED array 36 having individually addressable LEDs operable to emit light in the green and blue wavelength ranges. For example, the LEDs in the combined array 36 may emit either light in the blue or green wavelength ranges. In this embodiment, the combined array 36 is operable to emit light in the blue or green wavelength ranges simultaneously. The image source 24 also includes the LED array 32 operable to emit light in the red wavelength. Conventional image sources struggle to provide sufficient intensity of light in the red wavelength range for use in AR systems such as image light guide 22. By providing the LEDs operable to emit red light in a distinct array, the intensity of light in the red wavelength range can be independently controlled and increased relative to conventional image sources. In an embodiment, the image source 24 includes a separate thermal management system for each of the combined array 36 and the LED array 32.

Figure 4D:
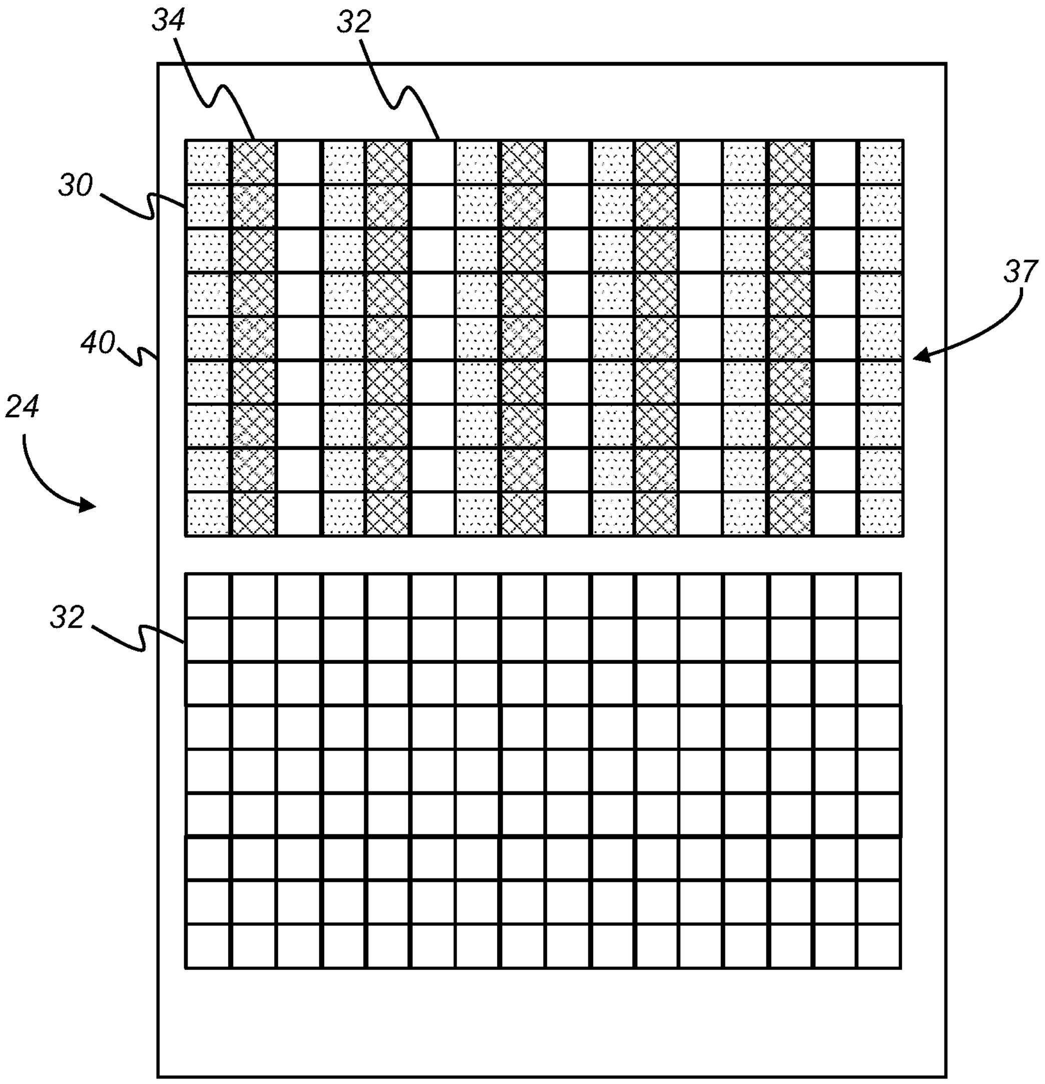
FIG. 4D shows a front view of a schematic of a portion of an image source according to another embodiment of the present disclosure.

As illustrated in FIG. 4D, in an embodiment, the image source 24 includes a combined LED array 37 having individually addressable LEDs operable to emit light in the red, green and blue wavelength ranges. In other words, individually addressable LEDs from the LED arrays 30, 32, 34 are included in the combined array 37 to generate polychromatic image-bearing light. The image source 24 includes a separate and distinct LED array 32 operable to emit light in the red wavelength range. In an embodiment, the image source 24 includes a separate thermal management system for each of the combined array 37 and the LED array 32.

Figure 7:
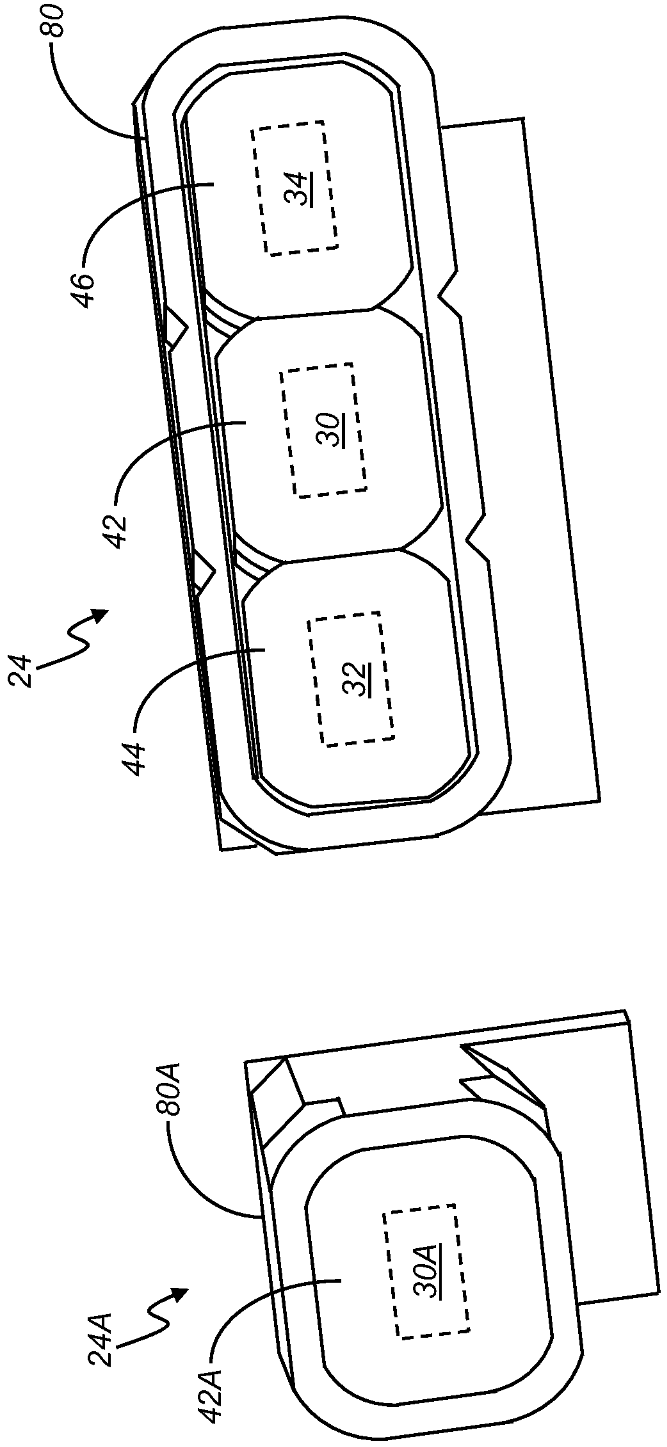
FIG. 7 shows a perspective view of a monochromatic image source and a polychromatic image source according to an embodiment of the present disclosure.

In an embodiment, as illustrated in FIG. 7, the LED arrays 30, 32, 34 and multi-lens systems 42, 44, 46 are formed as an integral unit. In other words, the LED arrays 30, 32, 34 and multi-lens systems 42, 44, 46 are positioned in a single housing 80. In an embodiment, the single housing 80 may be formed of potting around the LED arrays 30, 32, 34 and multi-lens systems 42, 44, 46. In an embodiment, a single LED array 30A and multi-lens system 42A is formed as an integral unit in a housing 80A.

Figure 5A:
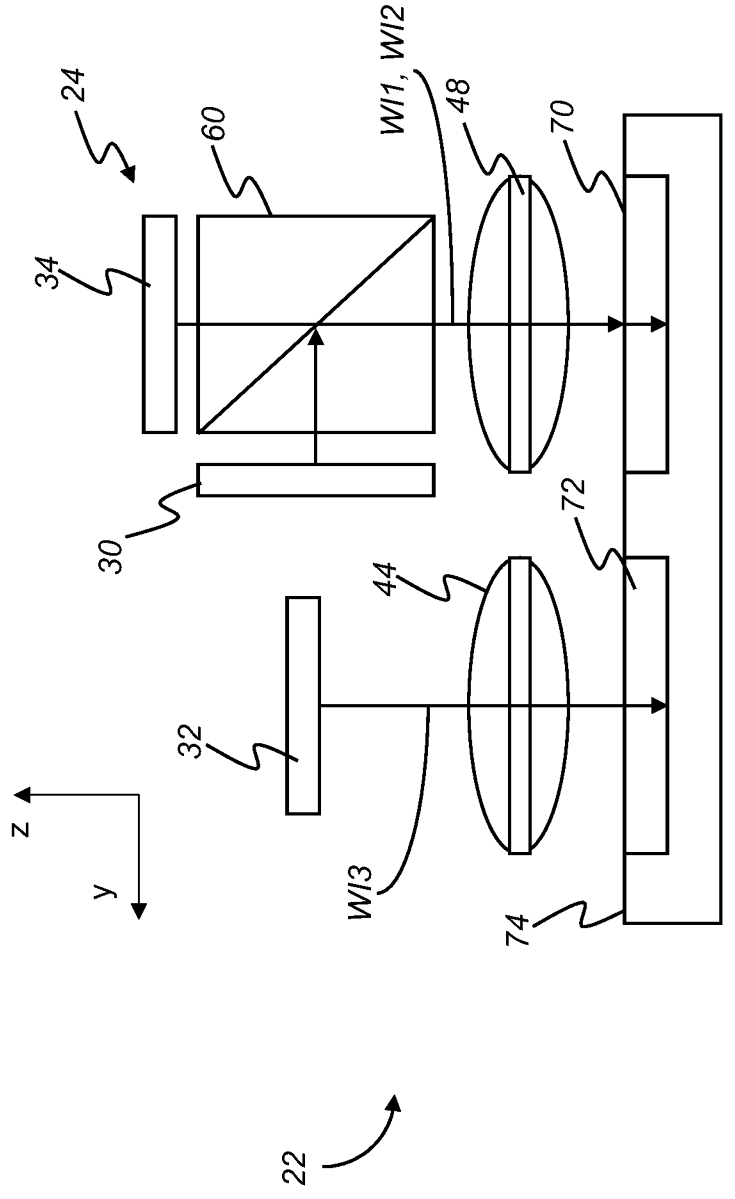
FIG. 5A shows an end view of a schematic of a portion of an image source and a waveguide according to an embodiment of the present disclosure.
Figure 5B:
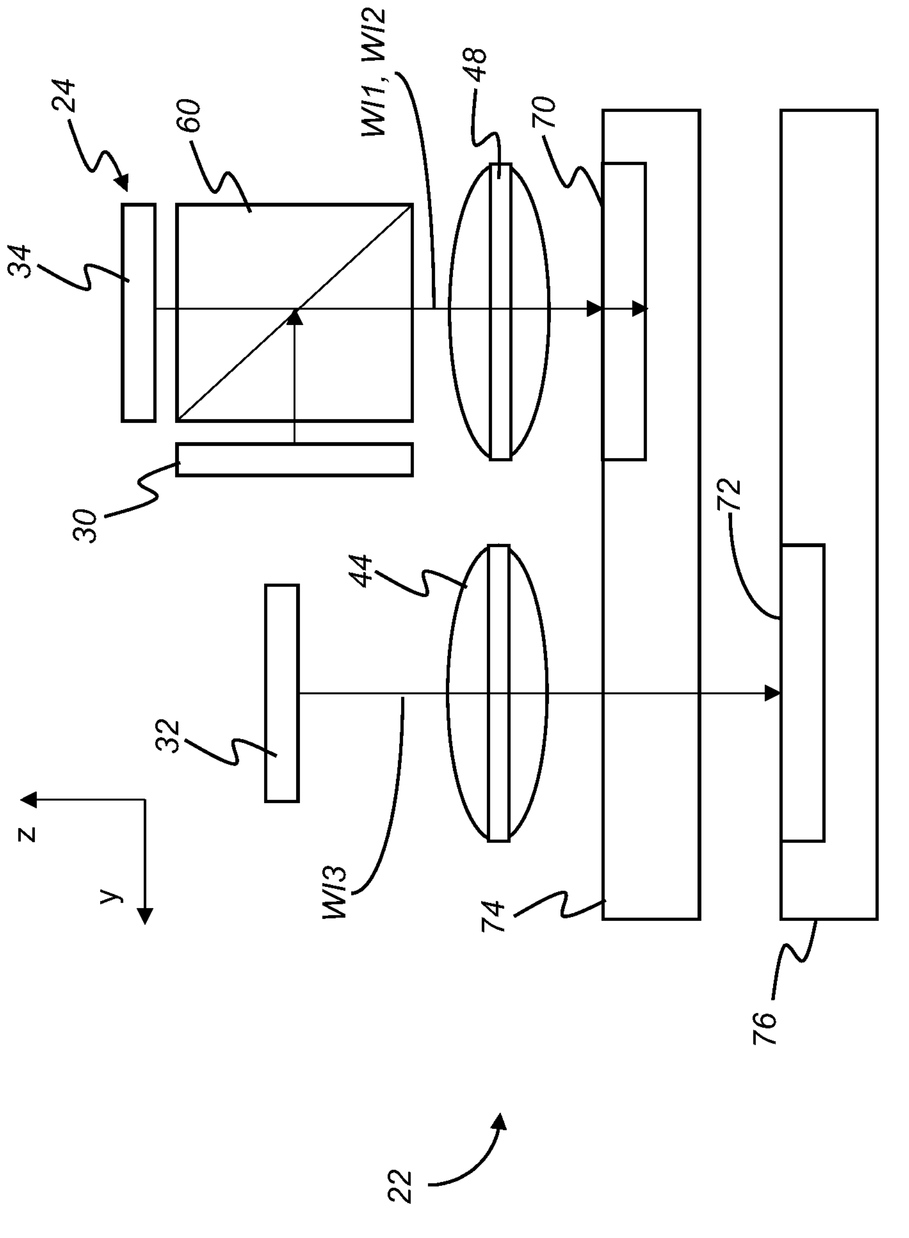
FIG. 5B shows an end view of a schematic of a portion of an image source and a waveguide stack according to an embodiment of the present disclosure.
Figure 5C:
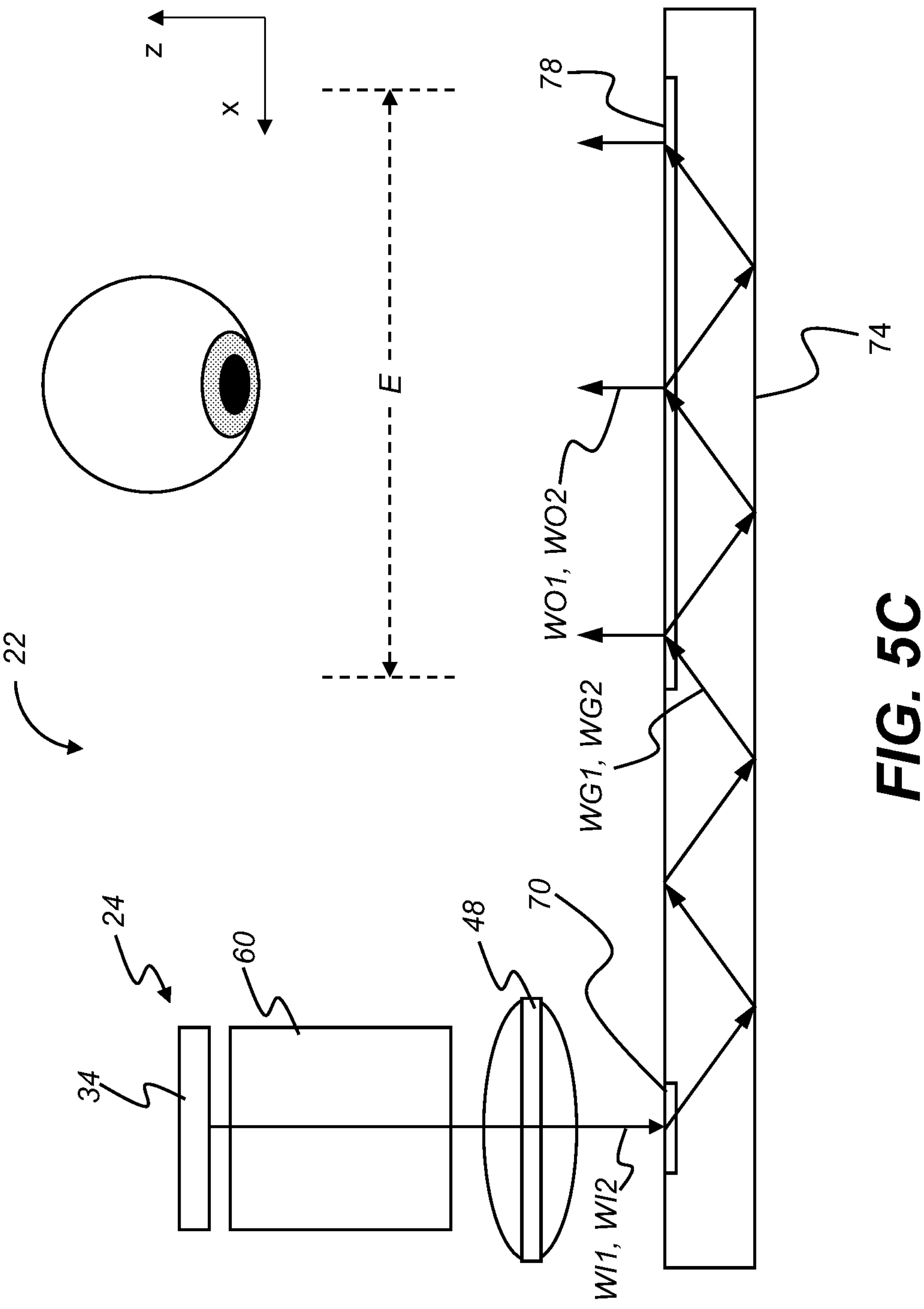
FIG. 5C shows a side view of a schematic of a portion of an image source and a waveguide according to FIG. 5A.

In an embodiment, as illustrated in FIG. 5A, the LED arrays 30, 32, 34 are not located on a fixed panel 40. The first LED array 30 and the third LED array 34 may be positioned perpendicular to one another about a beam combiner 60. For example, image-bearing light beams, or at least a central ray thereof, emitted by the first LED array 30 and the third LED array 34 may be oriented generally perpendicular relative to each other. Image-bearing light WI1, WI2 from the first and third LED arrays, 30, 34 transmitted through the combiner 60 is incident upon a single multi-lens system 48 located adjacent to the combiner 60. The second LED array 32 is located adjacent to the first and second LED arrays 30, 34. The second multi-lens system 44 is located adjacent to the second LED array 32 at an EFL distance. Image-bearing light WI1, WI2 transmitted through the multi-lens system 48 is incident upon a first in-coupling diffractive optic 70. In an embodiment, the first in-coupling diffractive optic 70 is operable to in-couple, into a waveguide substrate 74, at least a portion of the image-bearing light WI1, WI2 emitted from the first and third LED arrays 30, 34 at a total internal reflection (TIR) angle as image-bearing light WG1, WG2 for propagation along the waveguide substrate 74. Image-bearing light WI3 transmitted through the multi-lens system 44 is incident upon a second in-coupling diffractive optic 72. The second in-coupling diffractive optic 72 is operable to in-couple, into the substrate 74, at least a portion of the image-bearing light WI3 emitted from the second LED array 32 at a TIR angle for propagation along the waveguide substrate 74. In an embodiment, as illustrated in FIG. 5B, light transmitted through the multi-lens system 44 is transmitted through the waveguide substrate 74 and is incident upon a second in-coupling diffractive optic 72 located on/in a second waveguide substrate 76. The second in-coupling diffractive optic 72 is operable to in-couple, into the second waveguide substrate 76, at least a portion of the light emitted from the second LED array 32 at a TIR angle. As illustrated in FIG. 5C, one or more out-coupling diffractive optics 78 are operable to out-couple the image-bearing light from the waveguide(s) 74, 76 toward an eyebox E. Light from corresponding individual LEDs in the first, second, and third LED arrays 30, 32, 34 are aligned to form a single pixel in a virtual image as viewed in the waveguide eyebox E.

Figure 6:
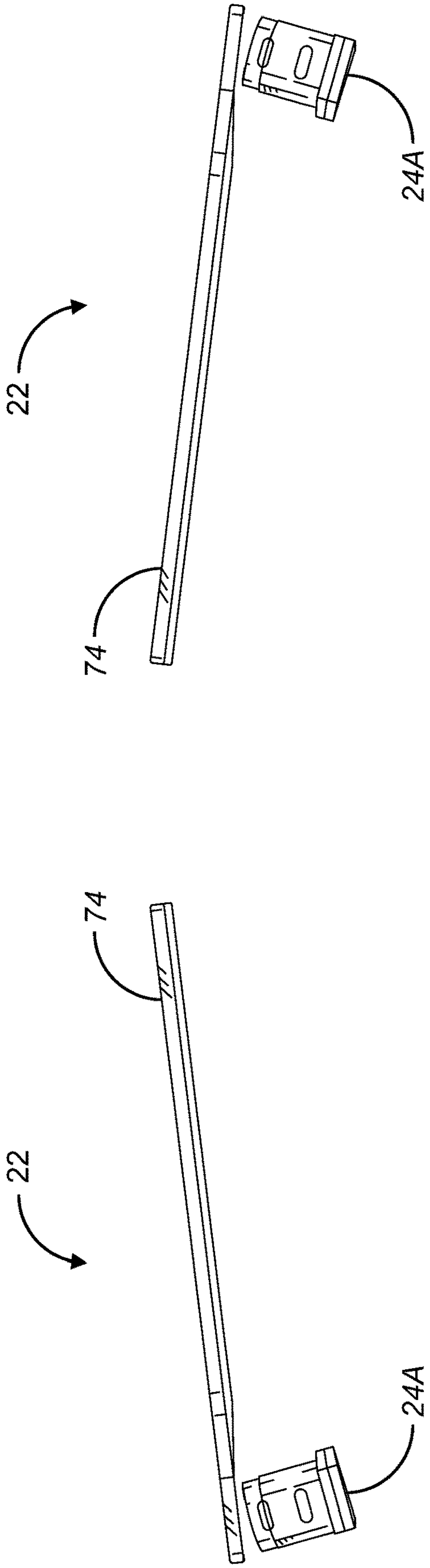
FIG. 6 shows a top view of a schematic of stereoscopic image sources and waveguides according to an embodiment of the present disclosure.

FIG. 6 shows waveguides 74 and image source 24A of a binocular smart glasses device. In an embodiment, the image source 24A utilizes a self-illuminated panel and a single lens element housed within a plastic enclosure. The plastic enclosure may be molded over the perimeter of the self-illuminated panel. When utilized with the smart glasses image light guide system described herein, the image source 24A does not require an adjustable focus, because the virtual images produced are focused at infinity. In contrast, traditional picoprojectors utilize front-illuminated displays and need illumination LEDs, making the conventional picoprojectors much larger than the image source 24A. FIG. 7 shows a polychromatic image source 24 located in a monolithic housing 80, such that first, second, and third LED arrays 30, 32, 34 and first, second, and third multi-lens systems 42, 44, 46 are fixed and unitary relative to each other.

One or more features of the embodiments described herein may be combined to create additional embodiments which are not depicted. While various embodiments have been described in detail above, it should be understood that they have been presented by way of example, and not limitation. It will be apparent to persons skilled in the relevant arts that the disclosed subject matter may be embodied in other specific forms, variations, and modifications without departing from the scope, spirit, or essential characteristics thereof. The embodiments described above are therefore to be considered in all respects as illustrative, and not restrictive. The scope of the invention is indicated by the appended claims, and all changes that come within the meaning and range of equivalents thereof are intended to be embraced therein.

What is claimed is:

1. An image source system, comprising:
- a fixed panel;
- a first addressable light emitting diode array coupled with said fixed panel;
- a second addressable light emitting diode array coupled with said fixed panel;
- a first lens system located at an effective focal length from said first light emitting diode array;
- a second lens system located at an effective focal length from said second light emitting diode array;
- a removable alignment lens arranged adjacent to said first and second lens systems during alignment, wherein light transmitted through said first and second lens systems is incident upon said alignment lens;
- wherein light from corresponding individual light emitting diodes in said first and second light emitting diode arrays are aligned to form a single pixel in a virtual image as viewed in a waveguide eyebox.

2. The image source system according to claim 1, wherein said first and second light emitting diode arrays are in signal communication with a processor operable to digitally align pixels generated by said first and second light emitting diode arrays.

3. The image source system according to claim 2, wherein digitally aligning pixels generated by said first and second light emitting diode arrays comprises, changing an ON/OFF state of one or more light emitting diodes of one or more of said first and second light emitting diode arrays until said pixels align in said waveguide eyebox.

4. The image source system according to claim 1, wherein each lens of said first and second lens systems is independently adjustable to align light from said corresponding individual light emitting diodes to form said single pixel in said virtual image as viewed in said waveguide eyebox.

5. The image source system according to claim 4, wherein light from said corresponding individual light emitting diodes is aligned to be parallel via said first and second lens systems.

6. The image source system according to claim 1, wherein said first light emitting diode array is operable to emit light of a first wavelength range, and said second light emitting diode array is operable to emit light of a second wavelength range.

7. An image light guide for conveying a virtual image comprising the image source system according to claim 1, further comprising:
- a planar waveguide operable to propagate image-bearing light beams;
- a first in-coupling diffractive optic formed along said waveguide, wherein said in-coupling diffractive optic is operable to diffract at least a portion of said image-bearing light beams from said image source into said waveguide in an angularly encoded form, and
- an out-coupling diffractive optic formed along said waveguide, wherein said out-coupling diffractive optic is operable to expand said image-bearing light beams and direct said expanded image-bearing light beams from said waveguide in an angularly decoded form toward said eyebox.

8. A method of aligning pixels of different wavelength ranges, comprising:
- providing a fixed panel;
- providing a first light emitting diode array coupled with said fixed panel;
- providing a second light emitting diode array coupled with said fixed panel;
- providing a first lens system located at an effective focal length from said first light emitting diode array;
- providing a second lens system located at an effective focal length from said second light emitting diode array;
- providing a removable alignment lens adjacent to said first and second lens systems during alignment of said pixels of different wavelength ranges, wherein light transmitted through said first and second lens systems is incident upon said alignment lens;
- providing a display surface at an effective focal length distance from said alignment lens opposite said first and second lens systems;
- generating a first light beam forming a first pixel with said first light emitting diode array;
- generating a second light beam forming a second pixel with said second light emitting diode array; and
- aligning said first and second pixels on said display surface.

9. The method of aligning pixels of different wavelength ranges according to claim 8, wherein said first and second light emitting diode arrays are in signal communication with a processor operable to digitally align said first and second pixels, wherein digitally aligning said first and second pixels comprises, changing an ON/OFF state of one or more light emitting diodes of one or more of said first and second light emitting diode arrays until said first and second pixels align on said display surface.

10. The method of aligning pixels of different wavelength ranges according to claim 8, wherein one or more of said first and second lens systems is independently adjusted to align image-bearing light from said corresponding individual light emitting diodes to align said first and second pixels on said display surface.

11. The method of aligning pixels of different wavelength ranges according to claim 8, wherein said first light emitting diode array comprises a first backplane and said second light emitting diode array comprises a second backplane, wherein one or more of said first and second backplanes are independently adjusted to align light from said corresponding individual light emitting diodes to align said first and second pixels on said display surface.

12. The method of aligning pixels of different wavelength ranges according to claim 8, wherein said first light emitting diode array is operable to emit light of a first wavelength range, and said second light emitting diode array is operable to emit light of a second wavelength range.

13. An image source, comprising:

a fixed panel;

a first addressable light emitting diode array coupled with said fixed panel;

a second addressable light emitting diode array coupled with said fixed panel;

a first lens system located at an effective focal length from said first light emitting diode array;

a second lens system located at an effective focal length from said second light emitting diode array;

wherein light from corresponding individual light emitting diodes in said first and second light emitting diode arrays are aligned to form a single pixel in a virtual image as viewed in a waveguide eyebox, wherein said first light emitting diode array comprises a first backplane and said second light emitting diode array comprises a second backplane, wherein one or more of said first and second backplanes are independently adjustable to align light from said corresponding individual light emitting diodes to form said single pixel in said virtual image as viewed in said waveguide eyebox.

* * * * *